United States Patent [19]
Marsico, Jr.

[11] Patent Number: 5,598,333
[45] Date of Patent: Jan. 28, 1997

[54] APPARATUS AND METHOD FOR ELECTRONICALLY TRACKING AND DUPLICATING USER INPUT TO AN INTERACTIVE ELECTRONIC DEVICE

[76] Inventor: Michael Marsico, Jr., 17 Laurel Rd., Lake Peekskill, N.Y. 10537

[21] Appl. No.: 397,416

[22] Filed: Mar. 1, 1995

Related U.S. Application Data

[62] Division of Ser. No. 199,816, Feb. 22, 1994, Pat. No. 5,408,408.

[51] Int. Cl.⁶ .................................................. G06F 161/00
[52] U.S. Cl. ........................ 395/183.14; 395/183.22
[58] Field of Search ........................... 364/419.2, 401 R, 364/132; 395/153, 155, 200.01, 200.05, 183.13, 183.14, 183.21, 183.22

[56] References Cited

U.S. PATENT DOCUMENTS

| | | | |
|---|---|---|---|
| 4,442,491 | 4/1984 | Olhausen, Jr. | 364/454 |
| 4,484,120 | 11/1984 | Olex et al. | 364/140 |
| 4,696,003 | 9/1987 | Kerr et al. | 395/183.14 |
| 4,899,306 | 2/1990 | Greer | 395/500 |
| 4,937,036 | 6/1990 | Beard et al. | 364/228.1 |
| 4,974,173 | 11/1990 | Stefik et al. | 395/153 |
| 5,022,028 | 6/1991 | Edmonds et al. | 395/183.14 |
| 5,086,393 | 2/1992 | Kerr et al. | 395/183.14 |
| 5,157,779 | 10/1992 | Washburn et al. | 395/183.13 |
| 5,157,782 | 10/1992 | Tuttle et al. | 395/183.21 |
| 5,265,201 | 11/1993 | Cabot et al. | 395/163 |
| 5,335,342 | 8/1994 | Pope et al. | 395/183.14 |
| 5,371,883 | 12/1994 | Gross et al. | 395/183.14 |
| 5,392,386 | 2/1995 | Chalas | 395/155 |
| 5,475,843 | 12/1995 | Halviatti et al. | 395/700 |
| 5,513,315 | 4/1996 | Tierney et al. | 395/183.13 |

*Primary Examiner*—Donald E. McElheny, Jr.
*Attorney, Agent, or Firm*—Michaelson & Wallace

[57] ABSTRACT

An apparatus and method to allow testers or developers of computer programs to electronically track and duplicate the occurrence of programming defects in interactive electronic devices accurately and quickly by recording and playing back user input data. The apparatus uses two processors, a host processor and a slave processor. The slave processor is directly coupled to the interactive electronic device. The host processor is coupled to the slave processor which allows the two processors to exchange data and control signals during the testing of the computer program. First, the slave processor receives the user input to the software being tested. Second, the host processor collects the data from the slave processor and reads, processes, and ultimately stores the data for later playback. Next, when requested, the host processor sends the data back to the slave processor which buffers the data and in turn feeds the data back to the test system exactly as it was originally input by the tester. Thus, in effect, the tester's input is electronically tracked and is precisely duplicated by recording and playing back the data previously input.

13 Claims, 7 Drawing Sheets

APPARATUS AND METHOD FOR ELECTRONICALLY TRACKING AND DUPLICATING USER INPUT TO AN INTERACTIVE ELECTRONIC DEVICE

This is a division of application Ser. No. 08/199,816, filed Feb. 22, 1994, now U.S. Pat. No. 5,408,408.

BACKGROUND OF THE INVENTION

1. Field of the Invention

This invention relates in general to utilities for computer program developers, and in particular, to tracking user input data to interactive electronic devices to aid in the programming development and testing process.

2. Description of Related Art

With the growing popularity of interactive electronic devices such as video games, personal computer programs and other interactive software programs, program developers have been prompted to find new ways to increase productivity in an increasing competitive market. One way to increase productivity is to utilize more efficient development techniques. However, presently the development process is a tedious and time-consuming task.

For example, during the development process, programming progress must be tested and retested to insure a "bug" free final product. A "bug" is an unintentional programming error or defect that causes the program to malfunction. One way to test programming development is to have human "testers" identify and duplicate programming defects in the program. Normally, the human tester reproduces the same sequence of inputs from memory that the tester made before and up to the discovery of the defect in the program. Thus, when the tester identifies a defect, the tester must either keep a record or remember the exact input and sequence of inputs that led to the discovery of the defect. The human tester is heavily relied upon to accurately and precisely duplicate the defect manually. Also, any defects must be communicated to the programmer so the programmer will be able to eliminate them.

However, with certain programs, the human tester cannot be expected to remember every move or input that was made leading up to the discovery of the defect and then duplicate all the moves or inputs. Thus, relying on the memory of human testers to duplicate defects is imprecise, inaccurate, and time consuming; this complicates the development process, wasting time and energy.

Therefore, there is a need for a device that allows developers or testers to accurately and precisely record and duplicate user input data to interactive electronic devices. Electronic methods are needed to provide accurate and quick duplication of the occurrence of defects as opposed to the inferior manual methods discussed above. Therefore, the development and testing processes become more cost effective because time is used more efficiently and the possibility of human error is eliminated.

Whatever the merits of the prior techniques and methods, they do not achieve the benefits of the present invention.

SUMMARY OF THE INVENTION

To overcome the limitations in the prior art described above, and to overcome other limitations that will become apparent upon reading and understanding the present specification, the present invention discloses an apparatus and method for recording and playing back user input data to interactive electronic devices operating on a system that allows developers to duplicate the occurrence of discovered defects accurately and quickly.

The invention includes two processors, a host processor and a slave processor. The slave processor is directly coupled to the system running the software being tested (the test system). The host processor is coupled to the slave processor, which allows the two processors to exchange data and control signals. Further, the invention has two modes, record mode and playback mode.

In record mode, the slave processor captures and stores the user input data. The host processor then collects and processes the data from the slave processor. The processed data is ultimately stored for later playback.

In playback mode, the host processor reads the previously stored processed data and sends it back to the slave processor. The slave processor buffers this data and feeds it back to the test system exactly as it was originally input by the tester. Thus, in effect, the tester's input data is electronically tracked and precisely duplicated by recording and playing back the input data.

An object of the present invention is to allow testers to accurately track the input data electronically and to quickly duplicate any defects previously found by recording and playing back the data previously input. This eliminates human tracking and the possibility of human error.

A feature of the present invention is to limit the dependency on human testers because their imprecision complicates the development process, wasting both time and money. A human cannot remember every move that was made, or key that was hit, and then duplicate them exactly; whereas an electronic device can.

An advantage of the present invention is that all tracking is achieved electronically, rather than manually, and thus inaccurate and time consuming manual testing methods and elements of human error are limited.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
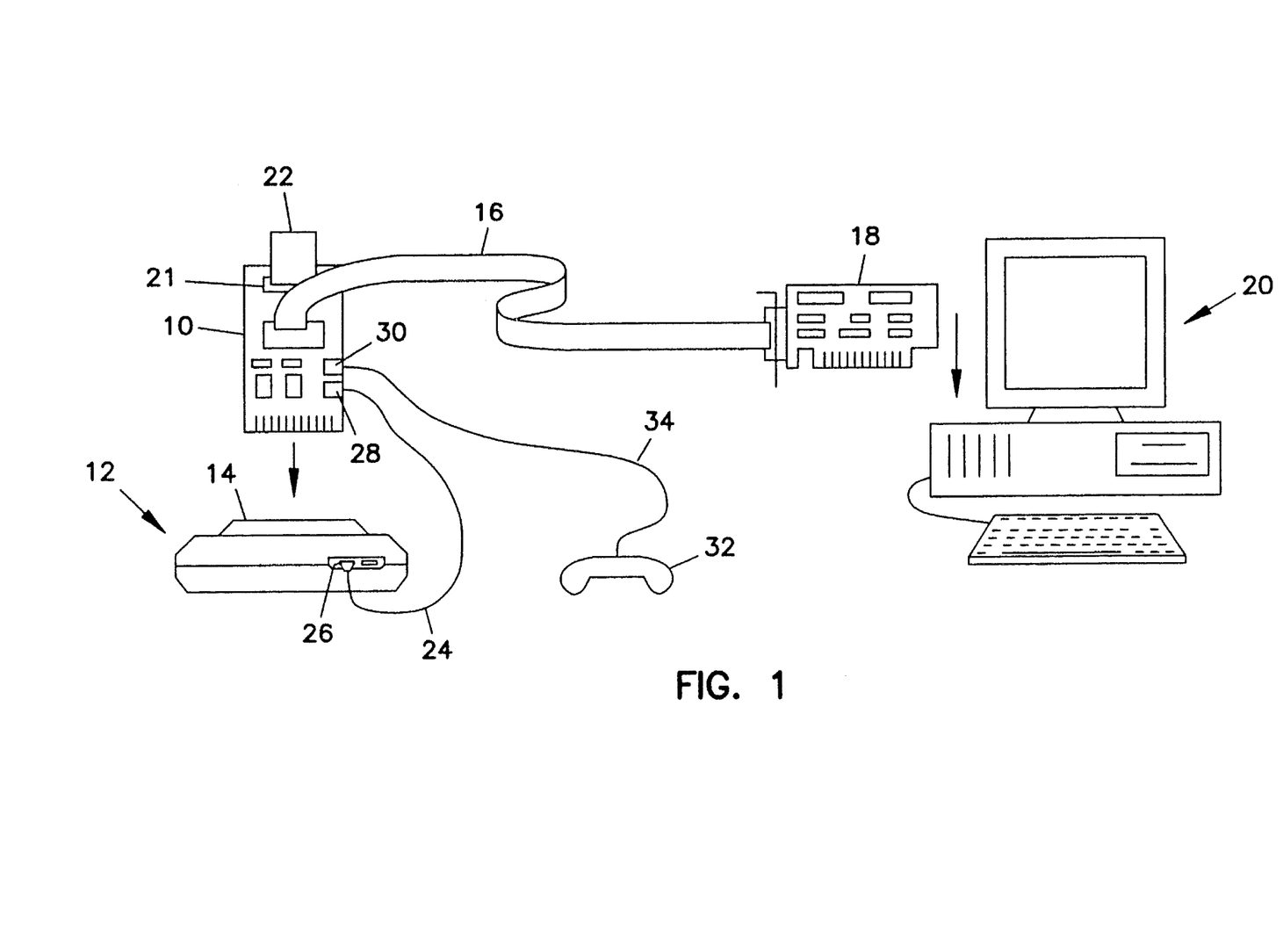
FIG. 1 is a diagram of the invention, which is further detailed in FIGS. 2 through 5.

FIG. 1 is an overview of the invention. The invention comprises slave processor 10, which can be a circuit board or microprocessor, coupled to a test system 12, which can be a video game system or computer, at a test system input 14. Cable connector 16 connects slave processor 10 to a host processor 18, which can be a circuit board or microprocessor. The host processor 18 can be installed in a host system or personal computer system 20 or can be self-contained. The test system 12 accepts a program device 22 that is being tested, which can be a video game cartridge. The program device 22 is normally inserted into the system input 14. Cable 24 interconnects the slave processor 10 with the system 12 via an input port 28 of the slave processor 10 and via an input/output port 26 of the system 12, respectively. This interconnection allows data exchange between the slave processor 10 and the test system 12. Also, input device 32, which can be a joystick, game controller, keyboard, or mouse, is connected to the test system via cable 34 through input 30 of the slave processor 10. Therefore, all user input can be received by the slave processor.

Figure 2:
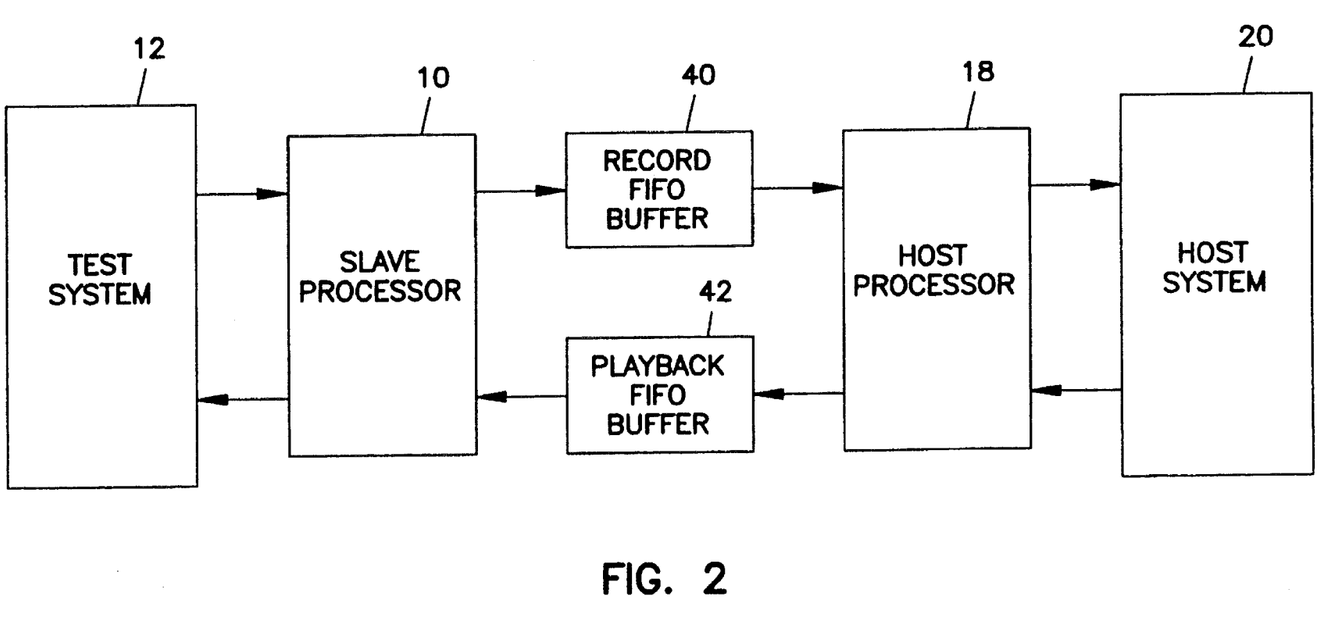
FIG. 2 is a flow diagram of one embodiment of the invention.

FIG. 2 is a flow diagram of the logic employed by the user input record and playback apparatus practiced in accordance with the principles of the present invention. The slave processor 10 intercepts user input data from the test system 12 when in record mode. This data is stored into a record FIFO (first in first out) buffer 40 by active low decoded address signals from address decoder circuitry. The FIFO buffer forces the first set of data in the buffer to be the first set of data to exit, the second set of data in the second set of data to exit the FIFO. The FIFO data is stored in the record FIFO buffer 40 until the host processor 18 requests the data. When the host processor 18 requests the data, the data then flows out of the FIFO buffer 40 and into the host system 20 where it is read.

Next, the host processor 18 stores the data into a playback FIFO buffer 42 when playback mode is enabled. The data is stored in the playback FIFO buffer 42 until it is requested by the slave processor 10 via decoded address signals from address decoder circuitry. When requested, the data is then fed back into the test system 12. Thus, in effect, the original user input is precisely duplicated. Further, slave processor 10, host processor 18, and host system 20 can be contained in one unit.

Figure 3:
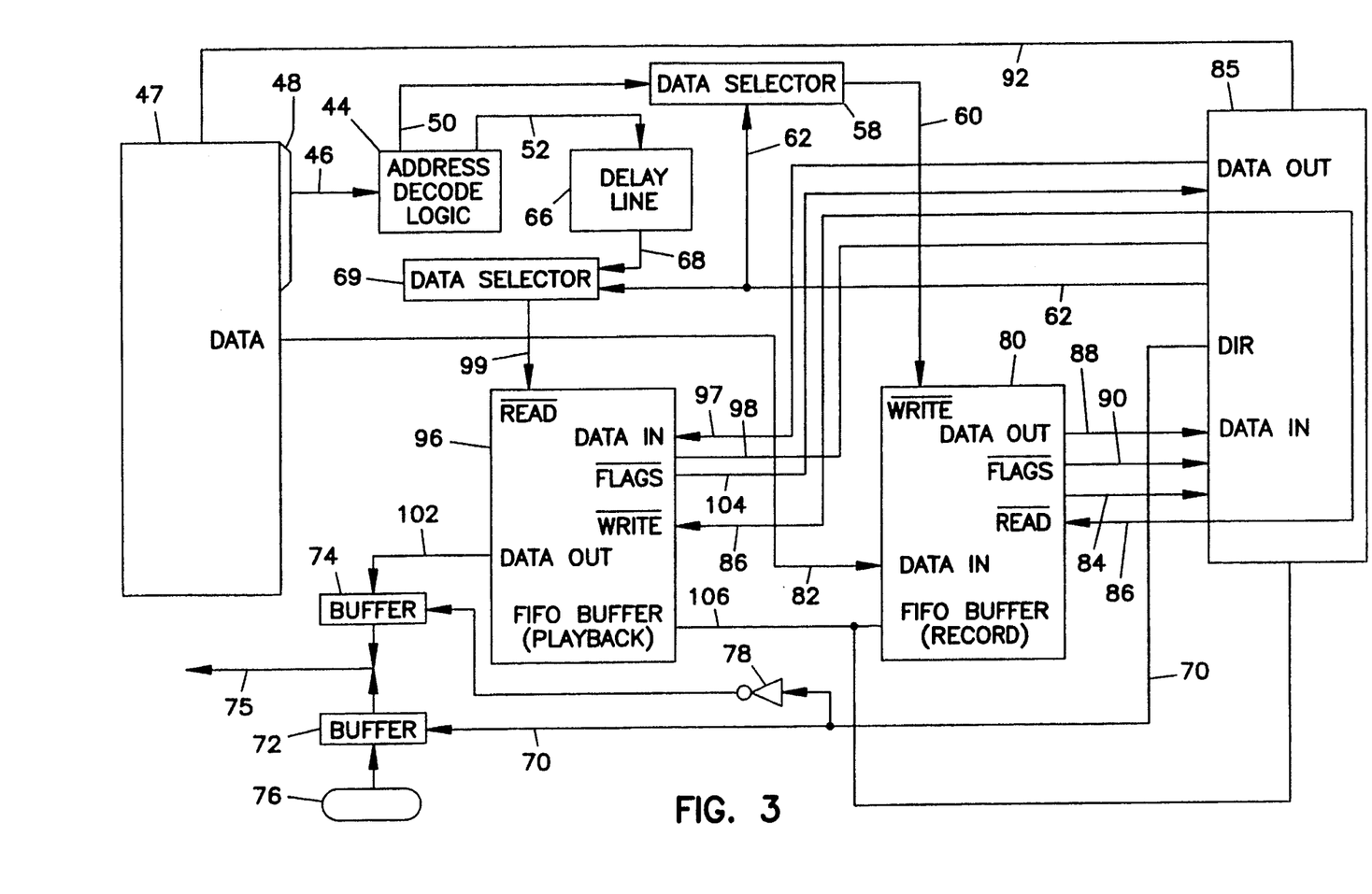
FIG. 3 is a schematic block diagram of one embodiment of the invention.

FIG. 3 is a detailed block diagram of one embodiment of the invention. An address decode logic 44 supplies an active low 50 and an active high 52 decoded address signal and is an integrated circuit such as programmable array logic chips (PALS). Input signals 46 from the test system 12 of FIG. 1 are received by the address decode logic 44 via an edge connector 48 of a test system bus 47. The address decode logic 44 is programmed to supply the decoded address output signals 50 and 52 when the state of the test system 12 indicates that an input is being issued on the test system 12.

The active low decoded address signal 50 is used in record mode. Signal 50 flows into a data selector 58, such as a quad 2-input data selector. The function of the data selector 58 is to allow the host system 18 and 20 of FIG. 1 to have control of the state of output signal 60 leaving the data selector 58. Through control of output signal 62, output signal 60 can track the decoded address signal 50 entering the data selector 58, or be forced to a high state.

The active high decoded address signal 52 is used in playback mode. The signal 52 flows into a delay line 66 where signal 52 is delayed. In the preferred embodiment a delay of by 100 nanoseconds is used. The delayed signal 68 exiting the delay line 66 then flows into a second data selector 69. The mode of these operations are controlled by a DIR signal 70 which controls the output of two tri-state output buffers 72 and 74. Either buffer 72 or 74 can force its output to drive input port 75 of test system 12. However, the DIR signal 70 is fed directly only into buffer 72. Also, the two buffers 72 and 74 are prohibited from simultaneously driving the input 75 by employing a hex inverter 78 between the DIR signal 70 and buffer 74. Thus, the DIR signal 70 is inverted by hex inverter 78 before being fed into buffer 74. This permits only one of the buffers 72 or 74 to drive the input 75 at any given time. Further, the system is in record mode when the DIR signal 70 is in a low state and in playback mode when it is in a high state.

In record mode, data entering 76 from the input device 32 of FIG. 1, such as a joystick, keyboard, mouse or game controller, flows through buffer 72 and is driven into the input port 75 of the test system 12. When the test system 12 requests a read of the data entering 76, the data is read in through the input port 75 and appears on the test system bus 47. Simultaneously, signal 50 is changed to a low state by the address decode 44 which causes a write line 60 of a record FIFO buffer 80, to go to low state. Also, data present on test system data bus lines 82 is written into the record FIFO buffer 80. Data will be continuously stored in this fashion until the record FIFO half full flag signal 84 changes to a low state indicating to the host processor 18 or system 20, via connector 85, that the record FIFO buffer 80 needs to be emptied.

At this time, the host processor 18 or system 20 will begin reading in the data by storing signal 86, which is connected to the record FIFO buffer read line, and reading the data present on the record FIFO buffer data output lines 88. Data will be continuously read in this fashion until the record FIFO empty flag signal 90 changes to a low state indicating to the host processor or system that the record FIFO buffer 80 is empty. The data collected is then saved in a file on the host system 20. This process of collecting data will continue until terminated by the user.

In playback mode, signal 92, which is an interconnection between the host processor 18 or system 20 and the test system 12, is held in a low state by the host processor 18 via connector 85, in effect halting the test system 12. With signal 92 held in low state, the host processor 18 or system 20 begins to read data from the previously recorded file. Under host system control, the data is driven onto signal lines 97, which are connected to the data inputs of a playback FIFO buffer 96. The data is then written into the playback FIFO buffer 96 by strobing signal 86. This process of storing data continues until a playback FIFO full flag signal 98 changes to a low state indicating to the host system 20 that the playback FIFO buffer 96 is full. At this time, the host system 20 strobes select signal 62, which in turn strobes signal 99, which is connected to the playback FIFO buffer 96 read line. As a result, the first byte of data stored in the playback FIFO buffer 96 is driven onto output lines 102 through buffer 74 to the test system 12 input port 75. This data is now ready to be read by the test system 12. At this time, signal 92 is released, allowing the test system 12 to run.

The test system 12 can request data entering 76 to read the data which was on the playback FIFO buffer 96. Simultaneously, signal 52 is pulled low by the address decode logic 44 after being delayed, for example, by 100 nanoseconds, by the delay line 66. This signal 68 passes through the data selector 69 and triggers the read line 99 of the playback FIFO buffer 96 to drive the next byte of data in its buffer onto output lines 102. Signal 102 then passes through buffer 74 and into the input port 75 of test system 12. This process continues until the playback FIFO half full flag signal 104 changes to a low state, indicating to the host processor 18 or system 20 that the playback FIFO buffer 96 is half empty. This causes the host processor 18 or system 20 to refill the playback FIFO buffer 96 as described above. The entire process continues until the end of the file has been reached and the playback FIFO buffer 96 is completely empty or termination is requested the user.

Further, after being powered up, the record 80 and playback 96 FIFO buffers must be reset before they can be used. This initialization process clears out the buffers of the record 80 and the playback 96 FIFO's and resets their internal read and write pointers. This is accomplished by pulling data lines 86, 99 and 60 to a high state, and then pulling the reset line 106 to a low state. Although data lines 86 and 106 can be directly controlled by the host processor 18 or system 20 via connector 85, data lines 99 and 60 cannot because they are indirectly controlled by the select signal 62 via the data selector 69. Therefore, when the select signal 62 is changed to a high state under host system control, signals 99 and 60 no longer track signals 68 and 50 respectively. Instead, signals 99 and 60 track their alternate inputs which are tied high, thus giving the host system a means of forcing signals 99 and 60 into a high state thereby permitting a reset of the buffers of the record 80 and playback 96 FIFOs.

Figure 4:
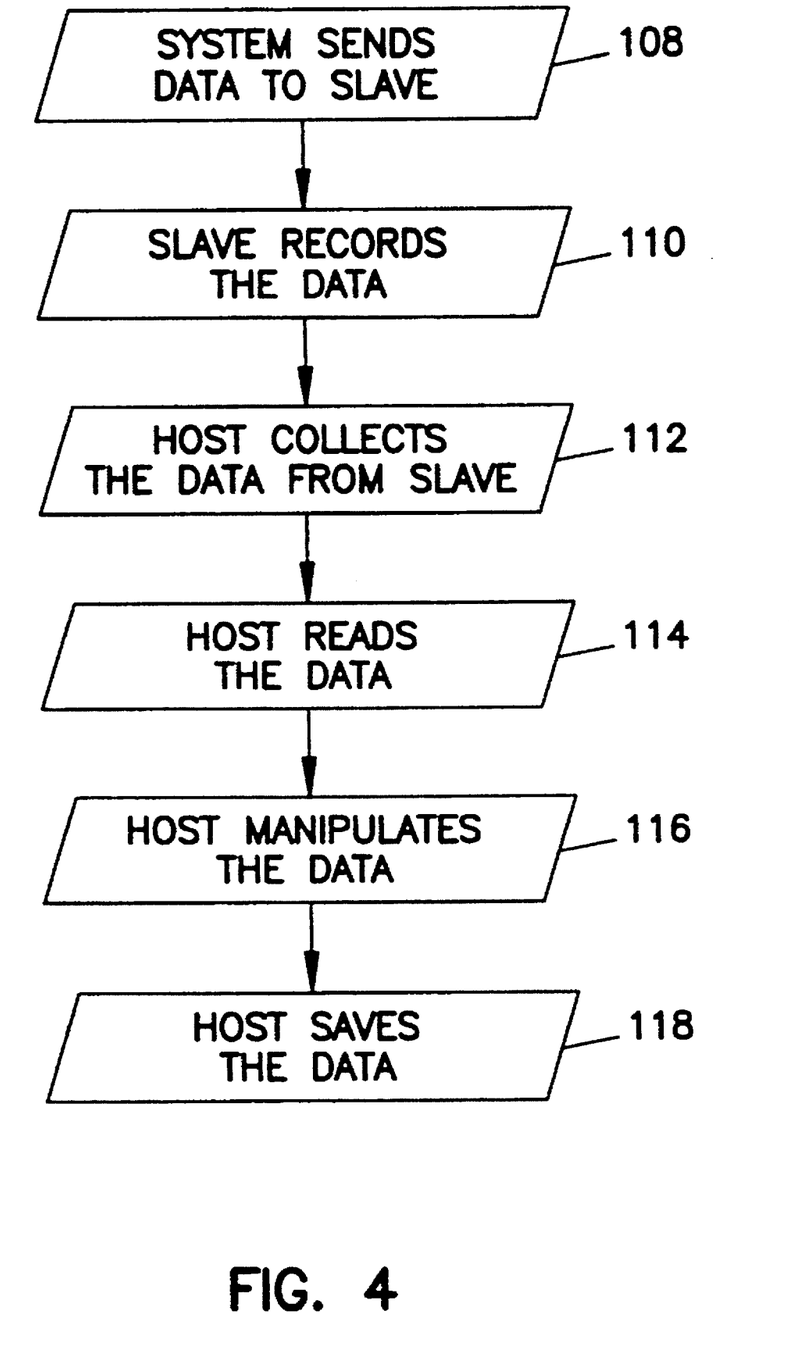
FIG. 4 is a flow chart illustrating one embodiment of record mode.

FIG. 4 is a flow diagram illustrating one embodiment of record mode. In record mode, the test system 12 of FIG. 1 sends 108 user input data to the slave processor 10 of FIG. 1. The slave processor 10 then records 110 the data. Next, the host processor 10 of FIG. 1 collects 112 the data from the slave processor 10 which is in turn read 114 the host processor 18. The data is then manipulated 116 and ultimately stored 118 for later playback.

Figure 5:
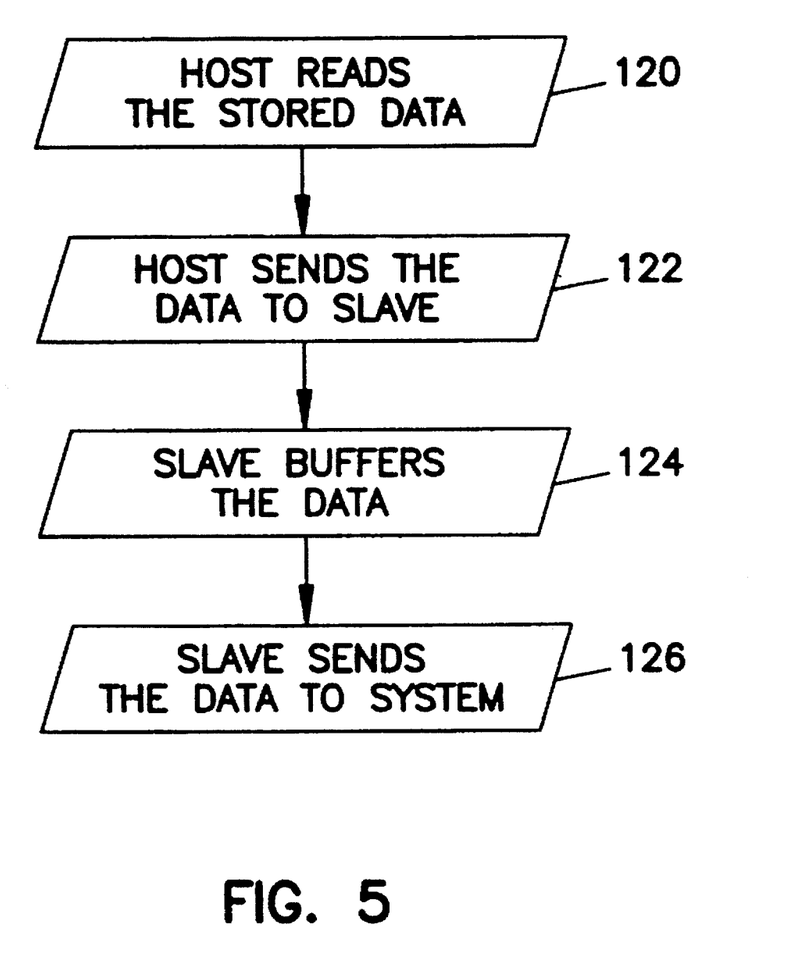
FIG. 5 is a flow chart illustrating one embodiment of playback mode.

FIG. 5 is a flow diagram illustrating one embodiment of playback mode. In playback mode, the host processor 18 reads 120 the previously recorded and stored data and sends 122 it to the slave processor 10. Next, the slave processor 10 buffers 124 this data and sends 126 it back to the test system 12 exactly as it was originally input.

Figure 6A:
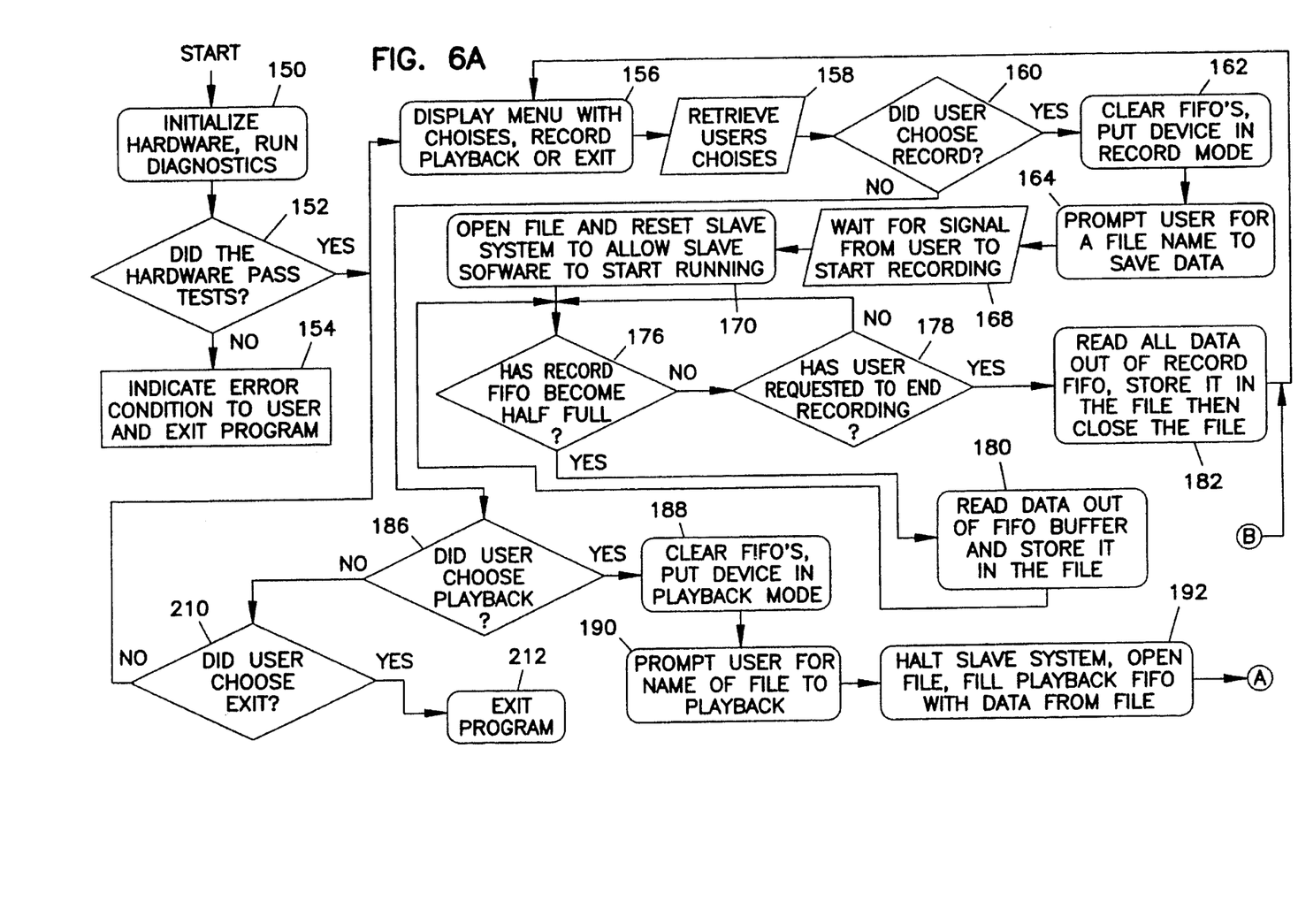
FIGS. 6A and 6B are a flow chart illustrating a user implemented control tool for use with the invention.
Figure 6B:
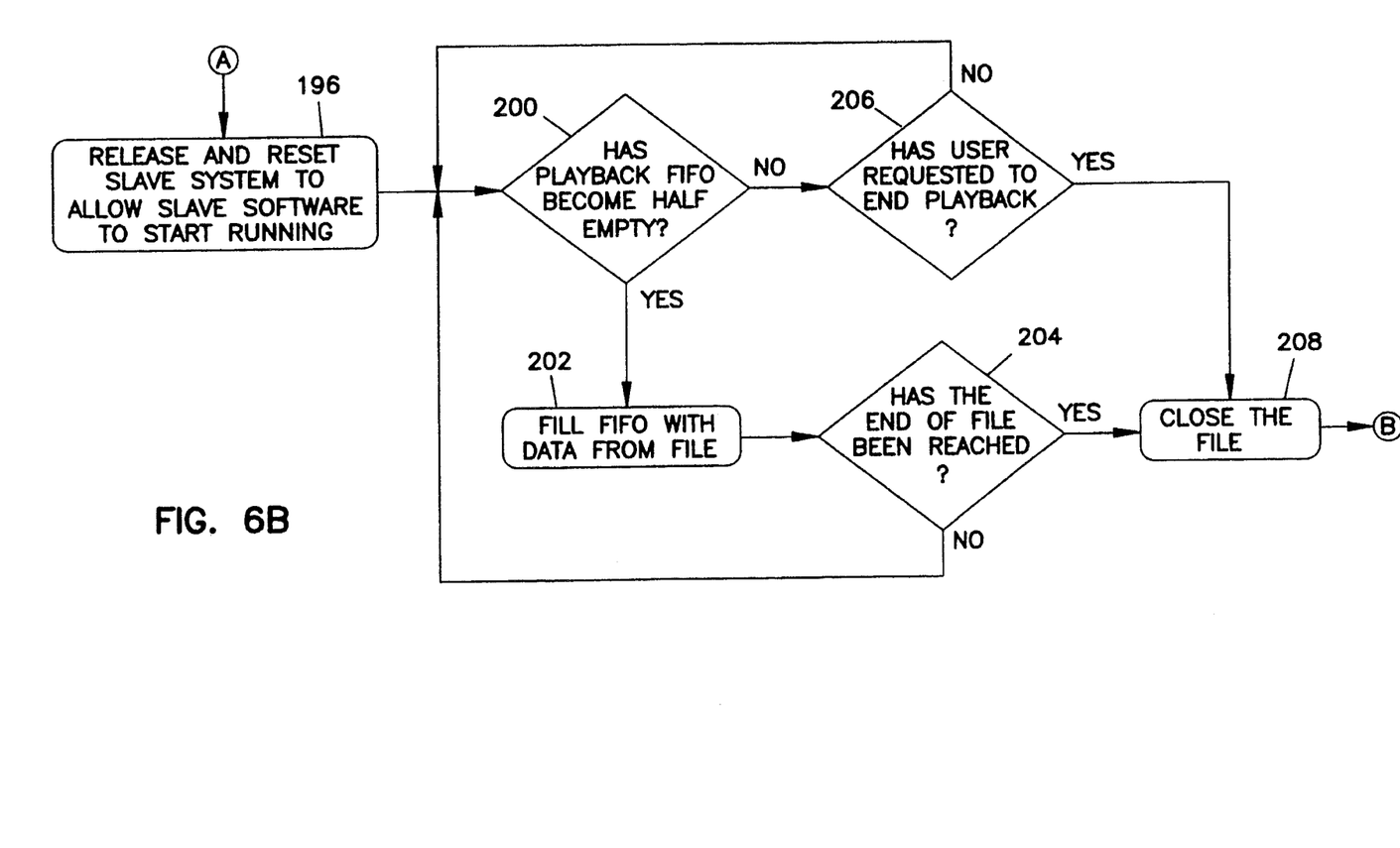

FIG. 6 is a flow diagram of a user implemented control tool for use with the invention describing the operation of the control tool. The hardware on the control tool is first initialized and diagnostics are run 150. If the hardware does not pass the test 152, then an error condition is indicated to the user and the program is exited 154. If the hardware passes the test, a menu displays a record, a playback, or an exit choice 156. The user's choice is received 158; if the user chooses record 160, then all FIFO buffers 80 and 96 of FIG. 3 are cleared and the control tool puts the entire system in record mode 162. The user is then prompted for a file name to save the data under 164. The control tool also waits for the user to signal to start recording 168. When prompted, a file is opened under the user chosen name and the slave processor 10 of FIG. 1 is reset and the control tool starts running 170. The control tool continuously monitors the record FIFO buffer 80 of FIG. 3. When the record FIFO buffer 80 becomes half full 176, data is read out of the record FIFO buffer 80 and stored in the opened file 180. Also, during the time the record FIFO has not become half full, the control tool continuously monitors the user for requests to end recording 178. If the user has requested to end recording, then all data is read out of the record FIFO buffer 80 and is stored in the opened file, and the file is then closed 182 and the user returns to the display menu 156.

Alternatively, at the display menu with the record, playback, or exit choices 156, if the user chooses playback 186, then all playback FIFO buffers 96 of FIG. 3 are cleared and the device is put into the playback mode 188. The user is then prompted for a file name to playback 190. When prompted, the slave processor 10 is halted and the playback file is opened 192. The playback FIFO buffer 96 is then filled with data from the playback file 192. Next, the slave processor 10 is released and reset to allow the control tool to start running 196. The tool continuously monitors the playback FIFO buffer 96. When the playback FIFO buffer 96 becomes half empty 200, the playback FIFO buffer 96 is filled with data from the playback file 202. When the end of the file has been reached 204, the file is closed 208 and the display menu with the record, playback, or exit choices are displayed 156. Also, during the time the playback FIFO buffer 96 has become half empty, the control tool continuously monitors the user for requests to end playback 206. If the user has requested to end playback, then the file is closed 208 and the user is returned to the display menu 156. Further, at the display menu 156, if the user chooses to exit 210 then the program is ended 212.

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for electronically tracking and duplicating user input operating software on an interactive electronic device, comprising:

(a) an input device for accepting the user input as the user input operates the software and translating the user input into electronic user input data;

(b) a real time slave processor, coupled to the interactive electronic device and the input device, for instantaneously capturing and storing the electronic user input data in real time from the input device as the user input continuously operates the software during ordinary operating conditions, and for transmitting the electronic user input data to the interactive electronic device; and (c) a host processor, coupled to the slave processor, for exchanging data and control signals therewith, wherein the host processor further comprises means for collecting the electronic user input data from the slave processor, for storing the electronic user input data in an electronic memory, for retrieving the electronic user input data from the electronic memory, and for transmitting the electronic user input data to the slave processor for later playback through the interactive electronic device, so that the electronic user input data is electronically tracked and precisely duplicated.

2. The apparatus as set forth in claim 1, wherein the user input means is a joystick.

3. The apparatus as set forth in claim 1, wherein the user input means is a game controller.

4. The apparatus as set forth in claim 1, wherein the user input means is a keyboard.

5. The apparatus as set forth in claim 1, wherein the user input means is a mouse.

6. The apparatus as set forth in claim 1, wherein the slave processor further comprises means for creating random user input data for automatically tracking and duplicating the user input data to the interactive device.

7. The apparatus as set forth in claim 1, wherein the means for capturing the user input data is a record buffer and the means for transmitting the data to the slave processor and back to the interactive device is a playback buffer.

8. A method of electronically tracking and duplicating user input operating software on an interactive electronic device, comprising the steps of:

(a) accepting the user input as the user input operates the software and translating the user input into electronic user input data;

(b) capturing and storing instantaneously the electronic user input data as the user input continuously operates the software during ordinary operating conditions in a slave processor coupled to the interactive electronic device, and then transmitting the electronic user input data to the interactive electronic device; and (c) exchanging data and control signals with a host processor, coupled to the slave processor, further comprising the steps of collecting the electronic user input data from the slave processor, storing the electronic user input data in an electronic memory of the host processor, retrieving the electronic user input data from the electronic memory of the host processor, and then transmitting the electronic user input data to the slave processor for later playback through the interactive electronic device, so that the electronic user input data is electronically tracked and precisely duplicated.

9. The method as set forth in claim 8, further comprising the step of generating the user input data using a joystick.

10. The method as set forth in claim 8, further comprising the step of generating the user input data using a game controller.

11. The method as set forth in claim 8, further comprising the step of generating the user input data using a keyboard.

12. The method as set forth in claim 8, further comprising the step of generating the user input data using a mouse.

13. The method as set forth in claim 8, further comprising the steps of creating random user input data in the slave processor for automatically tracking and duplicating the user input data to the interactive electronic device.

* * * * *